United States Patent
Li

(10) Patent No.: US 12,081,898 B2
(45) Date of Patent: Sep. 3, 2024

(54) IMAGE FUSION METHOD AND BIFOCAL CAMERA

(71) Applicant: AUTEL ROBOTICS CO., LTD., Shenzhen (CN)

(72) Inventor: Zhaozao Li, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 18/373,216

(22) Filed: Sep. 26, 2023

(65) Prior Publication Data

US 2024/0031515 A1    Jan. 25, 2024

Related U.S. Application Data

(63) Continuation of application No. 17/809,692, filed on Jun. 29, 2022, now Pat. No. 11,805,220, which is a
(Continued)

(30) Foreign Application Priority Data

Dec. 31, 2019    (CN) .......................... 201911420526.4

(51) Int. Cl.
*H04N 23/11*    (2023.01)
*G06T 7/60*    (2017.01)
(Continued)

(52) U.S. Cl.
CPC .............. *H04N 5/265* (2013.01); *G06T 7/60* (2013.01); *G06T 7/80* (2017.01); *H04N 5/2628* (2013.01);
(Continued)

(58) Field of Classification Search
CPC ...... H04N 5/265; H04N 5/2628; H04N 23/11; H04N 23/13; H04N 23/23; H04N 23/57;
(Continued)

(56) References Cited

U.S. PATENT DOCUMENTS

| 7,820,697 B2 | 10/2010 | Man et al. |
| 7,820,967 B2 * | 10/2010 | DeMarco ................. G01C 3/08 250/330 |

(Continued)

FOREIGN PATENT DOCUMENTS

| CN | 102982518 A | 3/2013 |
| CN | 104268853 A | 1/2015 |

(Continued)

OTHER PUBLICATIONS

The International Search Report issued in Application No. PCT/CN2020/133974 with dated Mar. 1, 2021, with English translation,(7p).

*Primary Examiner* — Mekonnen D Dagnew
(74) *Attorney, Agent, or Firm* — Arch & Lake LLP

(57) ABSTRACT

Embodiments of the present application provide an image fusion method and a bifocal camera. The method includes: acquiring a thermal image captured by the thermal imaging lens and a visible light image captured by the visible light lens; determining a first focal length when the thermal imaging lens captures the thermal image and a second focal length when the visible light lens captures the visible light image; determining a size calibration parameter and a position calibration parameter of the thermal image according to the first focal length and the second focal length; adjusting a size of the thermal image according to the size calibration parameter, and moving an adjusted thermal image to the visible light image according to the position calibration parameter for registration with the visible light image, to obtain to-be-fused images; and fusing the to-be-fused images to generate a bifocal fused image.

20 Claims, 3 Drawing Sheets

Related U.S. Application Data continuation of application No. PCT/CN2020/133974, filed on Dec. 4, 2020.

(51) Int. Cl.
    *G06T 7/80*     (2017.01)
    *H04N 5/262*     (2006.01)
    *H04N 5/265*     (2006.01)
    *H04N 23/13*     (2023.01)
    *H04N 23/23*     (2023.01)
    *H04N 23/57*     (2023.01)
    *H04N 23/69*     (2023.01)
    *B64D 47/08*     (2006.01)

(52) U.S. Cl.
    CPC ............ *H04N 23/11* (2023.01); *H04N 23/13* (2023.01); *H04N 23/23* (2023.01); *H04N 23/57* (2023.01); *H04N 23/69* (2023.01); *B64D 47/08* (2013.01); *G06T 2207/10032* (2013.01); *G06T 2207/10048* (2013.01); *G06T 2207/20132* (2013.01); *G06T 2207/20221* (2013.01)

(58) Field of Classification Search
    CPC ........ H04N 23/69; H04N 17/002; G06T 7/60; G06T 7/80; G06T 2207/10032; G06T 2207/10048; G06T 2207/20132; G06T 2207/20221; G06T 5/50; G06T 7/30; B64D 47/08; G06V 10/803; G06V 20/17; B64U 2101/30; B64C 39/024; G06F 18/25

See application file for complete search history.

(56) References Cited

U.S. PATENT DOCUMENTS

| | | | |
|---|---|---|---|
| 2010/0045809 A1* | 2/2010 | Packard | H04N 23/45 348/E5.022 |
| 2012/0242809 A1* | 9/2012 | White | H04N 23/11 348/51 |
| 2017/0109599 A1* | 4/2017 | Gupta | G06V 10/803 |
| 2017/0230585 A1 | 8/2017 | Nash et al. | |
| 2021/0344851 A1* | 11/2021 | Kester | G01J 5/53 |
| 2022/0262110 A1* | 8/2022 | Li | G06V 20/17 |

FOREIGN PATENT DOCUMENTS

| | | |
|---|---|---|
| CN | 104427245 A | 3/2015 |
| CN | 104574332 B | 8/2016 |
| CN | 107993258 A | 5/2018 |
| CN | 108510528 A | 9/2018 |
| CN | 108550104 A | 9/2018 |
| CN | 108763358 A | 11/2018 |
| CN | 109120869 A | 1/2019 |
| CN | 109839035 A | 6/2019 |
| CN | 110166714 A | 8/2019 |
| CN | 110519498 A | 11/2019 |
| CN | 111083381 A | 4/2020 |
| IN | 110361092 A | 10/2019 |

* cited by examiner

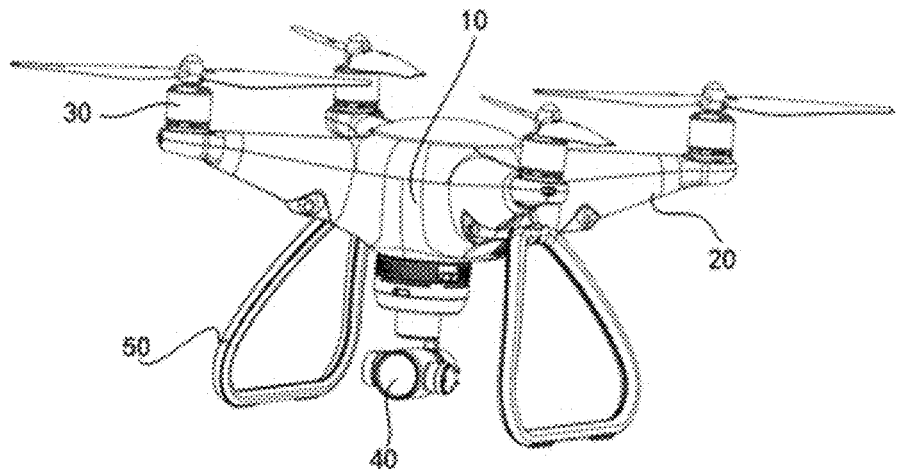

FIG. 1

| Acquire a thermal image captured by a thermal imaging lens and a visible light image captured by a visible light lens | S100 |

| Determine a first focal length when the thermal imaging lens captures the thermal image and a second focal length when the visible light lens captures the visible light image | S200 |

| Determine a size calibration parameter and a position calibration parameter of the thermal image according to the first focal length and the second focal length | S300 |

| Adjust a size of the thermal image according to the size calibration parameter, and move the adjusted thermal image to the visible light image according to the position calibration parameter for registration with the visible light image, to obtain to-be-fused images | S400 |

| Fuse the to-be-fused images to generate a bifocal fused image | S500 |

FIG. 2

IMAGE FUSION METHOD AND BIFOCAL CAMERA

CROSS-REFERENCE TO RELATED APPLICATIONS

The present application is a continuation of U.S. application Ser. No. 17/809,692, filed on Jun. 29, 2022, which is a continuation of International Application No. PCT/CN2020/133974, filed on Dec. 4, 2020, which claims the benefit of priority to Chinese Patent Application No. 201911420526.4, filed on Dec. 31, 2019, all of which are incorporated herein by reference in their entirety for all purposes.

BACKGROUND

Thermal imaging and visible light imaging are two current widely used imaging methods. In a desirable lighting situation, by visible light imaging, a clear visible light image with rich details can be obtained. However, if the lighting situation is poor, the obtained visible light image is blurred and loses details. For example, in a strong light environment, the visible light image obtained by visible light imaging has an obvious halo and loses details. In a situation with low visibility such as a foggy day, the visible light image obtained by visible light imaging is blurred. Thermal imaging is independent of weather and light, and a clear thermal image can be obtained in any situation by thermal imaging. However, the thermal image obtained by thermal imaging has no clear edge. Therefore, image fusion of the thermal image and the visible light image is provided to effectively take advantages of the two images, thereby capturing ideal images all the time.

Currently, during the image fusion of the thermal image and the visible light image, feature point matching is performed on feature points extracted from the thermal image in the visible light image for registration of the thermal image with the visible light image. During implementation of the disclosure, the inventor finds the following problems. If focal lengths for capturing the thermal image and the visible light image are different, imaging ratios of the thermal image and the visible light image are different. In this case, during the registration of the thermal image with the visible light image by feature point matching of the feature points extracted from the thermal image in the visible light image, the thermal image and the visible light image fail to coincide with each other. As a result, the thermal image cannot be accurately registered with the visible light image, resulting in poor picture quality after fusion of the thermal image and the visible light image.

SUMMARY

Embodiments of the disclosure relate to the field of image processing technologies, and in particular, to an image fusion method and a bifocal camera.

Embodiments of the disclosure aim to provide an image fusion method and apparatus, a bifocal camera, and an unmanned aerial vehicle (UAV). By using the embodiments of the disclosure, a thermal image can be accurately registered with a visible light image when focal lengths for capturing the thermal image and the visible light image are different, thereby improving picture quality of a fused image.

In order to resolve the foregoing technical problem, one or more embodiments of the disclosure adopt a technical solution that is as follows: An image fusion method is provided. The method is applicable to a bifocal camera. The bifocal camera includes a thermal imaging lens and a visible light lens. The method includes: acquiring a thermal image captured by the thermal imaging lens and a visible light image captured by the visible light lens; determining a first focal length when the thermal imaging lens captures the thermal image and a second focal length when the visible light lens captures the visible light image; acquiring a thermal image captured by the thermal imaging lens and a visible light image captured by the visible light lens; adjusting a size of the thermal image to be consistent with an image ratio of the visible light image; obtaining an origin calibration coordinate, the origin calibration coordinate configured to adjust an origin of an adjusted thermal image, overlapping the origin of the adjusted thermal image with origin calibration coordinates in the visible light image, to obtain to-be-fused images; and fusing the to-be-fused images to generate a bifocal fused image.

In order to resolve the foregoing technical problem, one or more embodiments of the disclosure adopt another technical solution that is as follows: An image fusion apparatus is provided. The apparatus is applicable to a bifocal camera. The bifocal camera includes a thermal imaging lens and a visible light lens. The apparatus includes: an acquisitor, configured to acquire a thermal image captured by the thermal imaging lens and a visible light image captured by the visible light lens; a determinator, configured to: determine a first focal length when the thermal imaging lens captures the thermal image and a second focal length when the visible light lens captures the visible light image; and an adjustor, configured to adjust a size of the thermal image to be consistent with an image ratio of the visible light image; obtain an origin calibration coordinate, the origin calibration coordinate configured to adjust an origin of an adjusted thermal image, overlap the origin of the adjusted thermal image with origin calibration coordinates in the visible light image, to obtain to-be-fused images; a processor, configured to fuse the to-be-fused images to generate a bifocal fused image.

In order to resolve the foregoing technical problem, one or more embodiments of the disclosure adopt another technical solution that is as follows: A bifocal camera is provided, including: a thermal imaging lens, configured to capture a thermal image; a visible light lens, configured to capture a visible light image; at least one processor; and a memory, communicatively connected to the at least one processor. The memory stores instructions executable by the at least one processor, the instructions, when executed by the at least one processor, causing the at least one processor to perform the above image fusion method.

In order to resolve the foregoing technical problem, one or more embodiments of the disclosure adopt another technical solution that is as follows: A UAV is provided, including: a fuselage; an arm, connected to the fuselage; a power apparatus, arranged on the arm; and the above bifocal camera, where the bifocal camera is connected to the fuselage.

BRIEF DESCRIPTION OF THE DRAWINGS

One or more embodiments are described as examples with reference to the corresponding figures in the accompanying drawings, and the descriptions are not to be construed as limiting the embodiments. Components in the accompanying drawings that have same reference numerals are repre- FIG. 1 is a schematic structural diagram of an unmanned aerial vehicle (UAV) according to an embodiment of the disclosure.

FIG. 2 is a schematic flowchart of an image fusion method according to an embodiment of the disclosure.

DETAILED DESCRIPTION

Figure 3:
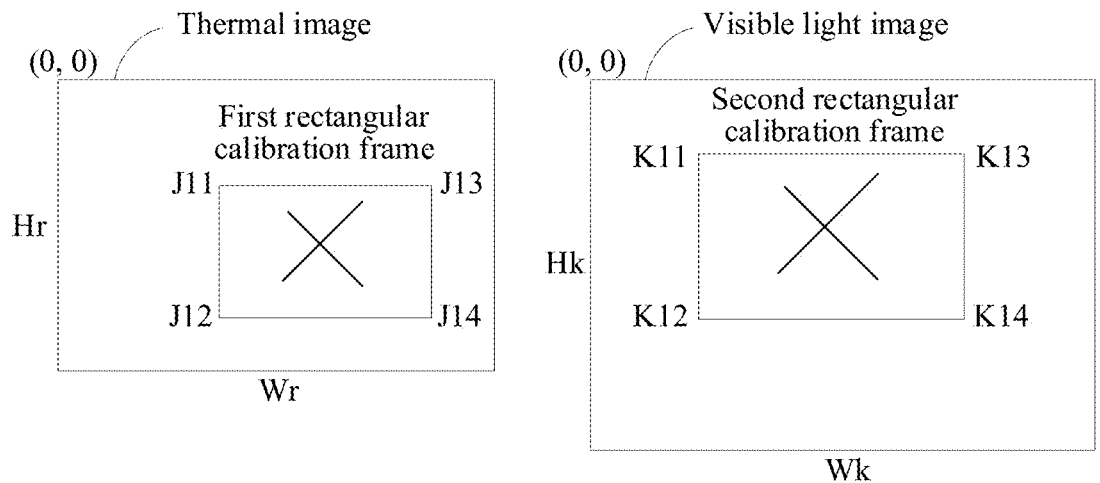
FIG. 3 is a schematic structural diagram of a thermal image and a visible light image according to an embodiment of the disclosure.

To make the objectives, technical solutions and advantages of the embodiments of the disclosure clearer, the technical solutions in the embodiments of the disclosure will be described clearly and thoroughly with reference to the accompanying drawings in the embodiments of the disclosure. Apparently, the embodiments described are merely some embodiments, rather than all of the embodiments of the disclosure. It should be understood that the specific embodiments described herein are merely used to explain the disclosure but are not intended to limit the disclosure. All other embodiments obtained by a person of ordinary skill in the art based on the embodiments of the disclosure shall fall within the protection scope of the disclosure.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions in this specification are merely used for an illustrative purpose.

In addition, technical features involved in the embodiments of the disclosure described below may be combined with each other provided that there is no conflict between each other.

The disclosure provides an image fusion method and apparatus. The method and the apparatus are applicable to a bifocal camera. By using the method and apparatus, the bifocal camera can accurately register a thermal image with a visible light image when focal lengths for capturing the thermal image and the visible light image are different, thereby improving picture quality of a fused image. The bifocal camera includes a thermal imaging lens and a visible light lens. The thermal imaging lens is configured to capture a thermal image, and the visible light lens is configured to capture a visible light image.

The bifocal camera is applicable to a variety of robots, so that a variety of robots can capture high-quality images all the time. The robots include but are not limited to an unmanned aerial vehicle (UAV), a sweeping robot or a navigation robot.

The disclosure is described in detail below by using an example in which the bifocal camera is applied to the UAV.

FIG. 1 shows a UAV 100 according to an embodiment of the disclosure. The UAV includes a fuselage 10, an arm 20, a power apparatus 30, a bifocal camera 40, a landing gear 50 and a flight control system. The arm 20, the bifocal camera 40 and the landing gear 50 are all connected to the fuselage 10. The flight control system is arranged in the fuselage 10. The power apparatus 30 is arranged on the arm 20. The power apparatus 30, the bifocal camera 40 and the landing gear 50 are all communicatively connected to the flight control system. Therefore, the flight control system can control flight of the UAV 100 by using the power apparatus 30, and can control the bifocal camera 40 to capture images and control the landing gear 50 to unfold and fold. After controlling the bifocal camera 40 to capture images, the flight control system can further acquire the captured images from the bifocal camera 40.

In this embodiment of the disclosure, four arms 20 are arranged. The four arms are evenly distributed around the fuselage 10 and each are configured to carry the power apparatus 30.

The power apparatus 30 includes a motor and a propeller connected to a shaft of the motor. The motor can drive the propeller to rotate to provide lift for the UAV 100 to realize flight. The motor can further change a flight direction of the UAV 100 by changing a rotation speed and a rotation direction of the propeller. When the power apparatus 30 is communicatively connected to the flight control system, the flight control system can control the flight of the UAV 100 by controlling the motor.

The power apparatus 30 is arranged at an end of the arm 20 not connected to the fuselage 10, and is connected to the arm 20 by the motor.

Preferably, the power apparatus 30 is arranged on each of the four arms of the UAV 100 to cause the UAV 100 to fly stably.

The bifocal camera 40 is arranged at a bottom of the fuselage 10 and can capture images under the control of the flight control system.

The bifocal camera 40 includes a thermal imaging lens and a visible light lens. The thermal imaging lens is configured to capture a thermal image, and the visible light lens is configured to capture a visible light image. When the bifocal camera 40 captures images, the thermal imaging lens and the visible light lens can simultaneously capture a thermal image and a visible light image of a same object. Focal lengths when the thermal imaging lens and the visible light lens simultaneously capture the thermal image and the visible light image of the same object may be the same or different.

When the focal lengths of the thermal imaging lens and the visible light lens are the same, imaging ratios of the thermal image and the visible light image are the same. When the focal lengths of the thermal imaging lens and the visible light lens are different, the imaging ratios of the thermal image and the visible light image are different. That is to say, the imaging ratios of thermal image and visible light image vary the focal length.

Further, when capturing the thermal image, the thermal imaging lens performs alignment to a target by using a first rectangular calibration frame. The first rectangular calibration frame varies with the focal length of the thermal imaging lens, and is always aligned to the target. When capturing the visible light image, the visible light lens performs alignment to the target by using a second rectangular calibration frame. The second rectangular calibration frame varies with the focal length of the visible light lens, and is always aligned to the target.

When the bifocal camera 40 simultaneously captures the thermal image and the visible light image of the same object by using the thermal imaging lens and the visible light lens, a size calibration parameter and a position calibration parameter of the thermal image may be determined by determining a first focal length when the thermal imaging lens captures the thermal image and a second focal length when the visible light lens captures the visible light image, then a size of the thermal image is adjusted according to the size calibration parameter, and the adjusted thermal image is moved to the visible light image according to the position calibration parameter for registration with the visible light image, to obtain to-be-fused images, and the to-be-fused images are fused to generate a bifocal fused image. The size of the thermal image is adjusted according to the size calibration parameter so that an imaging ratio of the thermal image is the same as that of the visible light image. At this time, the adjusted thermal image is moved to the visible light image according to the position calibration parameter for registration with the visible light image. Therefore, the thermal image can coincide with the visible light image, so that the thermal image is accurately registered with the visible light image. In this way, picture quality of the fused image is improved.

In some embodiments, the bifocal camera 40 may be arranged on the bottom of the fuselage 10 by using a gimbal, to rotate with the gimbal to capture images at different viewing angles.

The landing gear 50 is disposed on two opposite sides of the bottom of the fuselage 10, and is connected to the fuselage 10 by a driving apparatus. The landing gear 50 may be driven by the driving apparatus to unfold and fold. When the UAV 100 is about to come into contact with the ground, the driving apparatus controls the landing gear 50 to unfold. Therefore, the UAV 100 comes into contact with the ground by using the landing gear 50. During the flight of the UAV 100, the driving apparatus controls the landing gear 50 to fold to prevent the landing gear 50 from affecting the flight of the UAV 100. When the landing gear 50 is communicatively connected to the flight control system, the flight control system may control unfolding and folding of the landing gear 50 by controlling the driving apparatus.

The flight control system is communicatively connected to the power apparatus 30, the bifocal camera 40 and the landing gear 50 wiredly or wirelessly. The wireless connection includes but is not limited to Wi-Fi, Bluetooth or ZigBee.

It may be understood that, in this embodiment of the disclosure, after the bifocal camera 40 fuses the thermal image and the visible light image by performing image fusion, even if the focal lengths for capturing the thermal image and the visible light image are different, the thermal image can be accurately registered with the visible light image. In this way, a bifocal fused image having high picture quality is obtained. Therefore, the UAV 100 using the bifocal camera 40 can capture high-quality images all the time.

Further, FIG. 2 is a schematic flowchart of an image fusion method according to an embodiment of the disclosure. The image fusion method is performed by the above bifocal camera 40, to accurately register a thermal image with a visible light image when focal lengths for capturing the thermal image and the visible light image are different, thereby improving picture quality of a fused image.

Specifically, the image fusion method includes the following steps:

S100: Acquiring a thermal image captured by the thermal imaging lens and a visible light image captured by the visible light lens.

S200: Determining a first focal length when the thermal imaging lens captures the thermal image and a second focal length when the visible light lens captures the visible light image.

In this embodiment of the disclosure, the thermal image and the visible light image are images of a same target simultaneously captured by the thermal imaging lens and the visible light lens.

Since the focal lengths when the thermal imaging lens and the visible light lens capture the thermal image and the visible light image of the same object may be different, after the thermal image captured by the thermal imaging lens is acquired, the first focal length when the thermal imaging lens captures the thermal image is determined, and after the visible light image captured by the visible light lens is acquired, the second focal length when the visible light lens captures the visible light image is acquired.

A focal length set when the thermal imaging lens captures the thermal image is determined as the first focal length when the thermal imaging lens captures the thermal image. A focal length set when the visible light lens captures the visible light image is determined as the second focal length when the visible light lens captures the visible light image.

S300: Determining a size calibration parameter and a position calibration parameter of the thermal image according to the first focal length and the second focal length.

When the focal lengths of the thermal imaging lens and the visible light lens are different, imaging ratios of the thermal image and the visible light image are different. In this case, if the thermal image is directly registered with the visible light image, the thermal image cannot coincide with the visible light image. Therefore, a size calibration parameter and a position calibration parameter of the thermal image are required to be determined, so as to calibrate the thermal image according to the size calibration parameter and the position calibration parameter to coincide with the visible light image.

An imaging scale of the thermal image varies with the first focal length, and an imaging scale of the visible light image varies with the second focal length. Therefore, in order to ensure that the size calibration parameter and the position calibration parameter of the thermal image can be used to calibrate the thermal image to coincide with the visible light image, the size calibration parameter and the position calibration parameter of the thermal image vary with the imaging scale of the thermal image and the imaging scale of the visible light image, that is, vary with the first focal length and the second focal length. Therefore, in this embodiment of the disclosure, the size calibration parameter and the position calibration parameter of the thermal image are determined according to the first focal length and the second focal length. In this way, the determined size calibration parameter and position calibration parameter can be used to calibrate the thermal image to coincide with the visible light image.

The size calibration parameter is used for adjusting a size of the thermal image so that the imaging scale of the thermal image is the same as that of the visible light image. The size calibration parameter includes a calibration width and a calibration height. The calibration width is used for adjusting a width of the thermal image. The calibration height is used for adjusting a height of the thermal image.

The position calibration parameter is used for adjusting a position of the thermal image in the visible light image, so that the thermal image and the visible light image having the same imaging scale coincide with each other. The position calibration parameter includes origin calibration coordinates. The origin calibration coordinates are used for adjusting an origin position of the thermal image.

In some embodiments, the determining a size calibration parameter and a position calibration parameter of the thermal image according to the first focal length and the second focal length specifically includes: determining a zoom scale of the thermal image according to the first focal length and the second focal length; and determining the size calibration parameter and the position calibration parameter of the thermal image according to the zoom scale. Referring to FIG. 3, since the thermal imaging lens performs alignment to a target by using a first rectangular calibration frame when capturing the thermal image, the thermal image includes the first rectangular calibration frame. The first rectangular calibration frame varies with the first focal length. Since the visible light lens performs alignment to the target by using a second rectangular calibration frame when capturing the visible light image, the visible light image includes the second rectangular calibration frame. The second rectangular calibration frame varies with the second focal length.

Since the first rectangular calibration frame varies with the first focal length, a correspondence table of a preset first focal length and preset first corner point coordinates is pre-established. For example, a preset first focal length A1 corresponds to preset first corner point coordinates J1, where the preset first corner point coordinates J1 include preset first upper-left corner point coordinates J11, preset first lower-left corner point coordinates J12, preset first upper-right corner point coordinates J13 and preset first lower-right corner point coordinates J14; and a preset first focal length A2 corresponds to preset first corner point coordinates J2, where the preset first corner point coordinates J2 include preset first upper-left corner point coordinates J21, preset first lower-left corner point coordinates J22, preset first upper-right corner point coordinates J23 and preset first lower-right corner point coordinates J24.

Since the second rectangular calibration frame varies with the second focal length, a correspondence table of a preset second focal length and preset second corner point coordinates is pre-established. For example, a preset second focal length B1 corresponds to preset second corner point coordinates K1, where the preset second corner point coordinates K1 include preset second upper-left corner point coordinates K11, preset second lower-left corner point coordinates K12, preset second upper-right corner point coordinates K13 and preset second lower-right corner point coordinates K14; and a preset second focal length B2 corresponds to preset second corner point coordinates K2, where the preset second corner point coordinates K2 include preset second upper-left corner point coordinates K21, preset second lower-left corner point coordinates K22, preset second upper-right corner point coordinates K23 and preset second lower-right corner point coordinates K24.

Based on the above, the determining a zoom scale of the thermal image according to the first focal length and the second focal length specifically includes: determining first corner point coordinates of the first rectangular calibration frame according to the first focal length; determining second corner point coordinates of the second rectangular calibration frame according to the second focal length; and determining the zoom scale of the thermal image according to the first corner point coordinates and the second corner point coordinates.

The first corner point coordinates include first upper-left corner point coordinates, first lower-left corner point coordinates, first upper-right corner point coordinates and first lower-right corner point coordinates.

The second corner point coordinates include second upper-left corner point coordinates, second lower-left corner point coordinates, second upper-right corner point coordinates and second lower-right corner point coordinates.

During the determination of the first corner point coordinates of the first rectangular calibration frame according to the first focal length, a preset first focal length matching the first focal length is determined from the pre-established correspondence table of the preset first focal length and the preset first corner point coordinates, and preset first corner point coordinates corresponding to the preset first focal length matching the first focal length are determined as the first corner point coordinates of the first rectangular calibration frame. For example, when the first focal length is A1, it may be determined that the preset first focal length A1 in the pre-established correspondence table of the preset first focal length and the preset first corner point coordinates matches the first focal length A1. Therefore, the preset first corner point coordinates J1 corresponding to the preset first focal length A1 are determined as the first corner point coordinates of the first rectangular calibration frame. In this case, the first upper-left corner point coordinates are J11, the first lower-left corner point coordinates are J12, the first upper-right corner point coordinates are J13, and the first lower-right corner point coordinates are J14.

During the determination of the second corner point coordinates of the second rectangular calibration frame according to the second focal length, a preset second focal length matching the second focal length is determined from the pre-established correspondence table of the preset second focal length and the preset second corner point coordinates, and preset second corner point coordinates corresponding to the preset second focal length matching the second focal length are determined as the second corner point coordinates of the second rectangular calibration frame. For example, when the second focal length is B1, it may be determined that the preset second focal length B1 in the pre-established correspondence table of the preset second focal length and the preset second corner point coordinates matches the second focal length B1. Therefore, the preset second corner point coordinates K1 corresponding to the preset second focal length B1 are determined as the second corner point coordinates of the second rectangular calibration frame. In this case, the second upper-left corner point coordinates are K11, the second lower-left corner point coordinates are K12, the second upper-right corner point coordinates are K13, and the second lower-right corner point coordinates are K14.

During the determination of the zoom scale of the thermal image according to the first corner point coordinates and the second corner point coordinates, a first width of the first rectangular calibration frame is determined according to the first corner point coordinates, a second width of the second rectangular calibration frame is determined according to the second corner point coordinates, and then the zoom scale is determined according to the first width and the second width.

Specifically, during the determination of the first width of the first rectangular calibration frame according to the first corner point coordinates, any two corner point coordinates in the first corner point coordinates having a same ordinate are extracted, and the first width is determined according to a difference between abscissas of the extracted corner point coordinates. For example, the first corner point coordinates include the first upper-left corner point coordinates J11, the first lower-left corner point coordinates J12, the first upper-right corner point coordinates J13 and the first lower-right corner point coordinates J14, where J11 is $(x_3, y_4)$, J12 is $(x_3, y_3)$, J13 is $(x_4, y_4)$, J14 is $(x_4, y_3)$, J11 and J13 are the corner point coordinates having the same ordinate, and J12 and J14 are also the corner point coordinates having the same ordinate. In this case, J11 and J13 are extracted, or J12 and J14 are extracted, and then the first width is determined according to the difference between the abscissas of the extracted corner point coordinates. The first width is $x_4-x_3$.

During the determination of the second width of the second rectangular calibration frame according to the second corner point coordinates, any two corner point coordinates in the second corner point coordinates having a same ordinate are extracted, and the second width is determined according to a difference between abscissas of the extracted corner point coordinates. For example, the second corner point coordinates include the second upper-left corner point coordinates K11, the second lower-left corner point coordinates K12, the second upper-right corner point coordinates K13 and the second lower-right corner point coordinates K14, where K11 is $(x_5, y_6)$, K12 is $(x_5, y_5)$, K13 is $(x_6, y_6)$, K14 is $(x_6, y_5)$, K11 and K13 are the corner point coordinates having the same ordinate, and K12 and K14 are also the corner point coordinates having the same ordinate. In this case, K11 and K13 are extracted, or K12 and K14 are extracted, and then the second width is determined according to the difference between the abscissas of the extracted corner point coordinates. The second width is $x_6-x_5$.

In this case, a ratio of the second width to the first width is determined as the zoom scale. The zoom scale is $$\frac{x_6 - x_5}{x_4 - x_3}.$$

In some embodiments, during the determination of the zoom scale of the thermal image according to the first corner point coordinates and the second corner point coordinates, a first height of the first rectangular calibration frame may be further determined according to the first corner point coordinates, a second height of the second rectangular calibration frame may be further determined according to the second corner point coordinates, and then the zoom scale is determined according to the first height and the second height.

Specifically, during the determination of the first height of the first rectangular calibration frame according to the first corner point coordinates, any two corner point coordinates in the first corner point coordinates having a same abscissa are extracted, and the first height is determined according to a difference between ordinates of the extracted corner point coordinates. For example, the first corner point coordinates include the first upper-left corner point coordinates J11, the first lower-left corner point coordinates J12, the first upper-right corner point coordinates J13 and the first lower-right corner point coordinates J14, where J11 is $(x_3, y_4)$, J12 is $(x_3, y_3)$, J13 is $(x_4, y_4)$, J14 is $(x_4, y_3)$, J11 and J12 are the corner point coordinates having the same abscissa, and J13 and J14 are also the corner point coordinates having the same abscissa. In this case, J11 and J12 are extracted, or J13 and J14 are extracted, and then the first height is determined according to the difference between the ordinates of the extracted corner point coordinates. The first height is $y_4-y_3$.

During the determination of the second height of the second rectangular calibration frame according to the second corner point coordinates, any two corner point coordinates in the second corner point coordinates having a same abscissa are extracted, and the second height is determined according to a difference between ordinates of the extracted corner point coordinates. For example, the second corner point coordinates include the second upper-left corner point coordinates K11, the second lower-left corner point coordinates K12, the second upper-right corner point coordinates K13 and the second lower-right corner point coordinates K14, where K11 is $(x_5, y_6)$, K12 is $(x_5, y_5)$, K13 is $(x_6, y_6)$, K14 is $(x_6, y_5)$, K11 and K12 are the corner point coordinates having the same abscissa, and K13 and K14 are also the corner point coordinates having the same abscissa. In this case, K11 and K12 are extracted, or K13 and K14 are extracted, and then the second height is determined according to the difference between the ordinates of the extracted corner point coordinates. The second height is $y_6-y_5$.

In this case, a ratio of the second height to the first height is determined as the zoom scale. The zoom scale is $$\frac{y_6 - y_5}{y_4 - y_3}.$$

Further, the determining the size calibration parameter and the position calibration parameter of the thermal image according to the zoom scale specifically includes: acquiring a first initial width, a first initial height and first coordinates of a first positioning point that are of the thermal image; determining second coordinates of a second positioning point in the visible light image corresponding to the first positioning point; determining the calibration width according to the zoom scale and the first initial width; determining the calibration height according to the zoom scale and the first initial height; and determining the origin calibration coordinates according to the zoom scale, the first coordinates and the second coordinates.

The first initial width and the first initial height are a width and a height of the thermal image before adjustment.

The first positioning point is any corner point of the first rectangular calibration frame. In this case, the first coordinates of the first positioning point are any of the first upper-left corner point coordinates, the first lower-left corner point coordinates, the first upper-right corner point coordinates or the first lower-right corner point coordinates. For example, the first positioning point may be an upper-left corner point of the first rectangular calibration frame, a lower-left corner point of the first rectangular calibration frame, an upper-right corner point of the first rectangular calibration frame or a lower-right corner point of the first rectangular calibration frame. When the first positioning point is the upper-left corner point of the first rectangular calibration frame, the first coordinates are the first upper-left corner point coordinates. When the first positioning point is the lower-left corner point of the first rectangular calibration frame, the first coordinates are the first lower-left corner point coordinates. When the first positioning point is the upper-right corner point of the first rectangular calibration frame, the first coordinates are the first upper-right corner point coordinates. When the first positioning point is the lower-right corner point of the first rectangular calibration frame, the first coordinates are the first lower-right corner point coordinates.

The second positioning point is any corner point of the second rectangular calibration frame. In this case, the second coordinates of the second positioning point are any of the second upper-left corner point coordinates, the second lower-left corner point coordinates, the second upper-right corner point coordinates or the second lower-right corner point coordinates. For example, the second positioning point may be an upper-left corner point of the second rectangular calibration frame, a lower-left corner point of the second rectangular calibration frame, an upper-right corner point of the second rectangular calibration frame or a lower-right corner point of the second rectangular calibration frame. When the second positioning point is the upper-left corner point of the second rectangular calibration frame, the second coordinates are the second upper-left corner point coordinates. When the second positioning point is the lower-left corner point of the second rectangular calibration frame, the second coordinates are the second lower-left corner point coordinates. When the second positioning point is the upper-right corner point of the second rectangular calibration frame, the second coordinates are the second upper corner-right point coordinates. When the second positioning point is the lower-right corner point of the second rectangular calibration frame, the second coordinates are the second lower-right corner point coordinates.

The first positioning point and the second positioning point are points corresponding to each other. That is to say, when the first positioning point is the upper-left corner point of the first rectangular calibration frame, the second positioning point is the upper-left corner point of the second rectangular calibration frame. When the first positioning point is the lower-left corner point of the first rectangular calibration frame, the second positioning point is the lower-left corner point of the second rectangular calibration frame. When the first positioning point is the upper-right corner point of the first rectangular calibration frame, the second positioning point is the upper-right corner point of the second rectangular calibration frame. When the first positioning point is the lower-right corner point of the first rectangular calibration frame, the second positioning point is the lower-right corner point of the second rectangular calibration frame.

Based on the above, during the determination of the calibration width according to the zoom scale and the first initial width, a product of the first initial width and the zoom scale is determined as the calibration width. For example, if the zoom scale is X, the first initial width is Wr, and the calibration width is Wj, $$\frac{Wj}{Wr} = X.$$

During the determination of the calibration height according to the zoom scale and the first initial height, a product of the first initial height and the zoom scale is determined as the calibration height. For example, if the zoom scale is X, the first initial height is Hr, and the calibration height is Hj, $$\frac{Hj}{Hr} = X.$$

During the determination of the origin calibration coordinates according to the zoom scale, the first coordinates and the second coordinates, an abscissa of the origin calibration coordinates is determined according to the zoom scale, an abscissa of the first coordinates and an abscissa of the second coordinates, and an ordinate of the origin calibration coordinates is determined according to the zoom scale, an ordinate of the first coordinates and an ordinate of the second coordinates.

The abscissa of the origin calibration coordinates is equal to the abscissa of the second coordinates minus a product of the abscissa of the first coordinates and the zoom scale. The ordinate of the origin calibration coordinates is equal to the ordinate of the second coordinates minus a product of the ordinate of the first coordinates and the zoom scale. For example, assuming that the zoom scale is X and that the upper-left corner point of the first rectangular calibration frame is the first positioning point, the first coordinates are J11, where J11 is $(x_3, y_4)$. In this case, the upper-left corner point of the second rectangular calibration frame is the second positioning point, and the second coordinates are K11, where K11 is $(x_5, y_6)$. If $(x_0, y_0)$ is the origin calibration coordinates, $$\frac{x_5 - x_0}{x_3 - 0} = X, \text{ and } \frac{y_6 - y_0}{y_4 - 0} = X.$$

In some embodiments, during the determination of the size calibration parameter and the position calibration parameter of the thermal image according to the zoom scale, a correspondence table of a preset zoom scale, a preset size calibration parameter and a preset position calibration parameter may be pre-established. As shown in Table 1, each preset zoom scale corresponds to one preset size calibration parameter and one preset position calibration parameter.

TABLE 1

| Preset zoom scale | Preset size calibration parameter | Preset position calibration parameter |
| --- | --- | --- |
| X1 | Wj1, Hj1 | $x_{01}, y_{01}$ |
| X2 | Wj2, Hj2 | $x_{02}, y_{02}$ |
| X3 | Wj3, Hj3 | $x_{03}, y_{03}$ |
| X4 | Wj4, Hj4 | $x_{04}, y_{04}$ |

Based on the above, the determining the size calibration parameter and the position calibration parameter of the thermal image according to the zoom scale specifically includes: determining a preset zoom scale matching the zoom scale from the pre-established correspondence table of the preset zoom scale, the preset size calibration parameter and the preset position calibration parameter, determining a preset size calibration parameter corresponding to the preset zoom scale matching the zoom scale as the size calibration parameter of the thermal image, and determining a preset position calibration parameter corresponding to the preset zoom scale matching the zoom scale as the position calibration parameter of the thermal image. For example, when the zoom scale is X1, it may be determined that a preset zoom scale X1 in the pre-established correspondence table of the preset zoom scale, the preset size calibration parameter and the preset position calibration parameter matches the zoom scale X1. Therefore, the preset size calibration parameter Wj1, Hj1 corresponding to the preset zoom scale X1 is determined as the size calibration parameter of the thermal image, and the preset position calibration parameter $x_{o1}$, $y_{o1}$ corresponding to the preset zoom scale X1 is determined as the position calibration parameter of the thermal image.

It may be understood that, in some other embodiments, during the determination of the size calibration parameter and the position calibration parameter of the thermal image according to the first focal length and the second focal length, a correspondence table of a preset first focal length, a preset second focal length, a preset size calibration parameter and a preset position calibration parameter may be pre-established. As shown in Table 2, each preset first focal length corresponds to at least two preset second focal lengths, and each of the at least two preset second focal lengths corresponds to one preset size calibration parameter and one preset position calibration parameter. The at least two preset second focal lengths corresponding to each preset first focal length are the same.

TABLE 2

| Preset first focal length | Preset second focal length | Preset size calibration parameter | Preset position calibration parameter |
|---|---|---|---|
| f10 | f20 | Wj1, Hj1 | $x_{o1}$, $y_{o1}$ |
|  | f21 | Wj2, Hj2 | $x_{o2}$, $y_{o2}$ |
|  | f22 | Wj3, Hj3 | $x_{o3}$, $y_{o3}$ |
| f11 | f20 | Wj4, Hj4 | $x_{o4}$, $y_{o4}$ |
|  | f21 | Wj5, Hj5 | $x_{o5}$, $y_{o5}$ |
|  | f22 | Wj6, Hj6 | $x_{o6}$, $y_{o6}$ |
| f12 | f20 | Wj7, Hj7 | $x_{o7}$, $y_{o7}$ |
|  | f21 | Wj8, Hj8 | $x_{o8}$, $y_{o8}$ |
|  | f22 | Wj9, Hj9 | $x_{o9}$, $y_{o9}$ |

Based on the above, the determining a size calibration parameter and a position calibration parameter of the thermal image according to the first focal length and the second focal length specifically includes: determining, from the pre-established correspondence table of the preset first focal length, the preset second focal length, the preset size calibration parameter and the preset position calibration parameter, a preset first focal length matching the first focal length as a target focal length; determining a preset second focal length matching the second focal length from preset second focal lengths corresponding to the target focal length, determining a preset size calibration parameter corresponding to the preset second focal length, in the preset second focal lengths corresponding to the target focal length, matching the second focal length as the size calibration parameter of the thermal image, and determining a preset position calibration parameter corresponding to the preset second focal length, in the preset second focal lengths corresponding to the target focal length, matching the second focal length as the position calibration parameter of the thermal image. For example, when the first focal length is f10 and the second focal length is f20, it may be determined from the pre-established correspondence table of the preset first focal length, the preset second focal length, the preset size calibration parameters and the preset position calibration parameters that the preset first focal length f10 matches a first focal length f10. Therefore, the preset first focal length f10 is determined as the target focal length, and then a preset second focal length matching the second focal length f20 is determined from preset second focal lengths f20, f21 and f22 corresponding to the preset first focal length f10. Since the preset second focal length f20 matches the second focal length f20, the preset size calibration parameter Wj1, Hj1 corresponding to the second focal length f20 is determined as the size calibration parameter of the thermal image, and the preset position calibration parameter $x_{o1}$, $y_{o1}$ corresponding to the second focal length f20 is determined as the position calibration parameter of the thermal image.

S400: Adjusting a size of the thermal image according to the size calibration parameter, and moving the adjusted thermal image to the visible light image according to the position calibration parameter for registration with the visible light image, to obtain to-be-fused images.

Specifically, during the adjustment of the size of the thermal image according to the size calibration parameter, the first initial width of the thermal image is adjusted to the calibration width, and the first initial height of the thermal image is adjusted to the calibration height. At this time, the imaging scale of the adjusted thermal image is the same as that of the visible light image.

during the movement of the adjusted thermal image to the visible light image according to the position calibration parameters for registration with the visible light image, an origin of the adjusted thermal image is moved to the origin calibration coordinates in the visible light image. At this time, the thermal image and the visible light image having the same imaging ratio can coincide with each other. The thermal image and the visible light image coinciding with each other are registered to obtain to-be-fused images.

Figure 4:
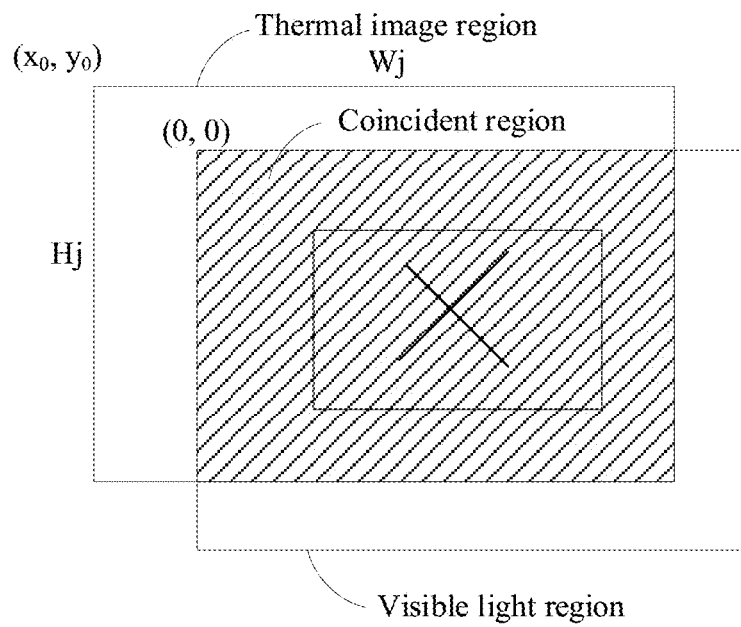
FIG. 4 is a schematic structural diagram of to-be-fused images according to an embodiment of the disclosure.

In the to-be-fused images, the adjusted thermal image is superimposed on the visible light image to form a thermal image region and a visible light region (shown in FIG. 4).

S500: Fusing the to-be-fused images to generate a bifocal fused image.

In some embodiments, after the to-be-fused images are fused, a coincident region of a thermal image region and a visible light region is required to be determined, and then regions in the to-be-fused images other than the coincident region are cropped.

The determining coincident region of a thermal image region and a visible light region in the to-be-fused images specifically includes: determining third corner point coordinates of the thermal image region; determining fourth corner point coordinates of the visible light region; determining coordinates of a first corner point and a second corner point of the coincident region according to the third corner point coordinates and the fourth corner point coordinates, where the first corner point and the second corner point are diagonal corner points; and determining coordinates of a third corner point and a fourth corner point of the coincident region according to the coordinates of the first corner point and the second corner point.

The third corner point coordinates include third upper-left corner point coordinates, third lower-left corner point coordinates, third upper-right corner point coordinates and third lower-right corner point coordinates.

The fourth corner point coordinates include fourth upper-left corner point coordinates, fourth lower-left corner point coordinates, fourth upper-right corner point coordinates and fourth lower-right corner point coordinates.

Since the thermal image region is a region formed by the adjusted thermal image, when the origin of the thermal image is any of an upper-left corner point, a lower-left corner point, an upper-right corner point or a lower-right corner point of the thermal image, the determining third corner point coordinates of the thermal image region specifically includes: determining the third corner point coordinates of the thermal image region according to the calibration width, the calibration height and the origin calibration coordinates.

During the determination of the third corner point coordinates of the thermal image region according to the calibration width, the calibration height and the origin calibration coordinates, if the origin of the thermal image is the upper-left corner point, the origin calibration coordinates are determined as the third upper-left corner point coordinates. In this case, an abscissa of the third lower-left corner point coordinates is the same as an abscissa of the third upper-left corner point coordinates, and an ordinate of the third lower-left corner point coordinates is an ordinate of the third upper-left corner point coordinates minus the calibration height. An abscissa of the third upper-right corner point coordinates is the abscissa of the third upper-left corner point coordinates plus the calibration width, and an ordinate of the third upper-right corner point coordinates is the same as the ordinate of the third upper-left corner point coordinates. An abscissa of the third lower-right corner point coordinates is the abscissa of the third upper-left corner point coordinates plus the calibration width, and an ordinate of the third lower-right corner point coordinates is the ordinate of the third upper-left corner point coordinates minus the calibration height.

If the origin of the thermal image is the lower-left corner point, the origin calibration coordinates are determined as the third lower-left corner point coordinates. In this case, the abscissa of the third upper-left corner point coordinates is the same as the abscissa of the third lower-left corner point coordinates, and the ordinate of the third upper-left corner point coordinates is the ordinate of the third lower-left corner point coordinates plus the calibration height. The abscissa of the third upper-right corner point coordinates is the abscissa of the third lower-left corner point coordinates plus the calibration width, and the ordinate of the third upper-right corner point coordinates is the ordinate of the third lower-left corner point coordinates plus the calibration height. The abscissa of the third lower-right corner point coordinates is the abscissa of the third lower-left corner point coordinates plus the calibration width, and the ordinate of the third lower-right corner point coordinates is the same as the ordinate of the third lower-left corner point coordinates.

If the origin of the thermal image is the upper-right corner point, the origin calibration coordinates are determined as the third upper-right corner point coordinates. In this case, the abscissa of the third upper-left corner point coordinates is the abscissa of the third upper-right corner point coordinates minus the calibration width, and the ordinate of the third upper-left corner point coordinates is the same as the ordinate of the third upper-right corner point coordinates. The abscissa of the third lower-left corner point coordinates is the abscissa of the third upper-right corner point coordinates minus the calibration width, and the ordinate of the third lower-left corner point coordinates is the ordinate of the third upper-right corner point coordinates minus the calibration height. The abscissa of the third lower-right corner point coordinates is the same as the abscissa of the third upper-right corner point coordinates, and the ordinate of the third lower-right corner point coordinates is the ordinate of the third upper-right corner point coordinates minus the calibration height.

If the origin of the thermal image is the lower-right corner point, the origin calibration coordinates are determined as the third lower-right corner point coordinates. In this case, the abscissa of the third upper-left corner point coordinates is the abscissa of the third lower-right corner point coordinates minus the calibration width, and the ordinate of the third upper-left corner point coordinates is the ordinate of the third lower-right corner point coordinates plus the calibration height. The abscissa of the third lower-left corner point coordinates is the abscissa of the third lower-right corner point coordinates minus the calibration width, and the ordinate of the third lower-left corner point coordinates is the same as the ordinate of the third lower-right corner point coordinates. The abscissa of the third upper-right corner point coordinates is the same as the abscissa of the third lower-right corner point coordinates, and the ordinate of the third upper-right corner point coordinates is the ordinate of the third lower-right corner point coordinates plus the calibration height.

Since the visible light region is a region formed by the visible light image, when the origin of the visible light image is any of an upper-left corner point, a lower-left corner point, an upper-right corner point or a lower-right corner point of the visible light image, the determining fourth corner point coordinates of the visible light region specifically includes: acquiring a second initial width Wk, a second initial height Hk and origin coordinates of the visible light image; and determining the fourth corner point coordinates of the visible light region according to the second initial width Wk, the second initial height Hk and the origin coordinates.

During the determination of the fourth corner point coordinates of the visible light region according to the second initial width, the second initial height and the origin coordinates, if the origin of the visible light image is the upper-left corner point, the origin coordinates are determined as the fourth upper-left corner point coordinates. In this case, an abscissa of the fourth lower-left corner point coordinates is the same as an abscissa of the fourth upper-left corner point coordinates, and an ordinate of the fourth lower-left corner point coordinates is an ordinate of the fourth upper-left corner point coordinates minus the second initial height. An abscissa of the fourth upper-right corner point coordinates is the abscissa of the fourth upper-left corner point coordinates plus the second initial width, and an ordinate of the fourth upper-right corner point coordinates is the same as the ordinate of the fourth upper-left corner point coordinates. An abscissa of the fourth lower-right corner point coordinates is the abscissa of the fourth upper-left corner point coordinates plus the second initial width, and an ordinate of the fourth lower-right corner point coordinates is the ordinate of the fourth upper-left corner point coordinates minus the second initial height.

If the origin of the visible light image is the lower-left corner point, the origin coordinates are determined as the fourth lower-left corner point coordinates. In this case, the abscissa of the fourth upper-left corner point coordinates is the same as the abscissa of the fourth lower-left corner point coordinates, and the ordinate of the fourth upper-left corner point coordinates is the ordinate of the fourth lower-left corner point coordinates plus the second initial height. The abscissa of the fourth upper-right corner point coordinates is the abscissa of the fourth lower-left corner point coordinates plus the second initial width, and the ordinate of the fourth upper-right corner point coordinates is the ordinate of the fourth lower-left corner point coordinates plus the second initial height. The abscissa of the fourth lower-right corner point coordinates is the abscissa of the fourth lower-left corner point coordinates plus the second initial width, and the ordinate of the fourth lower-right corner point coordinates is the same as the ordinate of the fourth lower-left corner point coordinates.

If the origin of the visible light image is the upper-right corner point, the origin coordinates are determined as the fourth upper-right corner point coordinates. In this case, the abscissa of the fourth upper-left corner point coordinates is the abscissa of the fourth upper-right corner point coordinates minus the second initial width, and the ordinate of the fourth upper-left corner point coordinates is the same as the ordinate of the fourth upper-right corner point coordinates. The abscissa of the fourth lower-left corner point coordinates is the abscissa of the fourth upper-right corner point coordinates minus the second initial width, and the ordinate of the fourth lower-left corner point coordinates is the ordinate of the fourth upper-right corner point coordinates minus the second initial height. The abscissa of the fourth lower-right corner point coordinates is the same as the abscissa of the fourth upper-right corner point coordinates, and the ordinate of the fourth lower-right corner point coordinates is the ordinate of the fourth upper-right corner point coordinates minus the second initial height.

If the origin of the visible light image is the lower-right corner point, the origin coordinates are determined as the fourth lower-right corner point coordinates. In this case, the abscissa of the fourth upper-left corner point coordinates is the abscissa of the fourth lower-right corner point coordinates minus the second initial width, and the ordinate of the fourth upper-left corner point coordinates is the ordinate of the fourth lower-right corner point coordinates plus the second initial height. The abscissa of the fourth lower-left corner point coordinates is the abscissa of the fourth lower-right corner point coordinates minus the second initial width, and the ordinate of the fourth lower-left corner point coordinates is the same as the ordinate of the fourth lower-right corner point coordinates. The abscissa of the fourth upper-right corner point coordinates is the same as the abscissa of the fourth lower-right corner point coordinates, and the ordinate of the fourth upper-right corner point coordinates is the ordinate of the fourth lower-right corner point coordinates plus the second initial height.

Since the first corner point and the second corner point are diagonal corner points, the first corner point and the second corner point may be respectively the lower-left corner point and the upper-right corner point of the coincident region, or may be respectively the upper-left corner point and the lower-right corner point of the coincident region.

When the first corner point and the second corner point are respectively the lower-left corner point and the upper-right corner point of the coincident region, the formulas for determining the coordinates of the first corner point and the second corner point of the coincident region are as follows:

$$\begin{cases} x_1' \le x_1'' \le x_2', x_1 = x_1' \\ x_1'' < x_1', x_1 = x_1'' \end{cases}, \begin{cases} y_1' \le y_1'' \le y_2', y_1 = y_1'' \\ y_1'' < y_1', y_1 = y_1' \end{cases}$$

$$\begin{cases} x_2'' \le x_2', x_2 = x_2'' \\ x_2'' > x_2', x_2 = x_2' \end{cases}, \begin{cases} y_2'' \le y_2', y_2 = y_2'' \\ y_2'' > y_2', y_2 = y_2' \end{cases}$$

where $(x_1, y_1)$ and $(x_2, y_2)$ are respectively the coordinates of the first corner point and the second corner point; $(x_1'', y_2'')$ $(x_1'', y_1'')$ $(x_2'', y_2'')$ $(x_2'', y_1'')$ are respectively the third upper-left corner point coordinates, the third lower-left corner point coordinates, the third upper-right corner point coordinates and the third lower-right corner point coordinates; and $(x_1', y_2')$, $(x_1', y_1')$, $(x_2', y_2')$ and $(x_2', y_1')$ are respectively the fourth upper-left corner point coordinates, the fourth lower-left corner point coordinates, the fourth upper-right corner point coordinates and the fourth lower-right corner point coordinates.

In this case, during the determination of the coordinates of the third corner point and the fourth corner point of the coincident region according to the coordinates of the first corner point and the second corner point, if the third corner point and the fourth corner point are respectively an upper-left corner point and a lower-right corner point of the coincident region, an abscissa of the first corner point is determined as an abscissa of the third corner point, and an ordinate of the second corner point is determined as an ordinate of the third corner point, an abscissa of the second corner point is determined as an abscissa of the fourth corner point, and an ordinate of the first corner point is determined as an ordinate of the fourth corner point.

Alternatively, the determining a size calibration parameter and a position calibration parameter of the thermal image according to the first focal length and the second focal length specifically includes:

determining a zoom scale of the thermal image according to the first focal length and the second focal length; and determining the size calibration parameter and the position calibration parameter of the thermal image according to the zoom scale.

Alternatively, the thermal image includes a first rectangular calibration frame, and the visible light image includes a second rectangular calibration frame.

The determining a zoom scale of the thermal image according to the first focal length and the second focal length specifically includes:

determining first corner point coordinates of the first rectangular calibration frame according to the first focal length, where the first corner point coordinates include first upper-left corner point coordinates, first lower-left corner point coordinates, first upper-right corner point coordinates and first lower-right corner point coordinates;

determining second corner point coordinates of the second rectangular calibration frame according to the second focal length, where the second corner point coordinates include second upper-left corner point coordinates, second lower-left corner point coordinates, second upper-right corner point coordinates and second lower-right corner point coordinates; and determining the zoom scale of the thermal image according to the first corner point coordinates and the second corner point coordinates.

Alternatively, the determining the zoom scale of the thermal image according to the first corner point coordinates and the second corner point coordinates specifically includes:

determining a first width of the first rectangular calibration frame according to the first corner point coordinates;

determining a second width of the second rectangular calibration frame according to the second corner point coordinates; and determining the zoom scale according to the first width and the second width;

or determining a first height of the first rectangular calibration frame according to the first corner point coordinates;

determining a second height of the second rectangular calibration frame according to the second corner point coordinates; and determining the zoom scale according to the first height and the second height.

Alternatively, the determining a first width of the first rectangular calibration frame according to the first corner point coordinates specifically includes:

extracting any two corner point coordinates in the first corner point coordinates having a same ordinate, and determining the first width according to a difference between abscissas of the extracted corner point coordinates.

The determining a second width of the second rectangular calibration frame according to the second corner point coordinates specifically includes:
  extracting any two corner point coordinates in the second corner point coordinates having a same ordinate, and determining the second width according to a difference between abscissas of the extracted corner point coordinates.

The determining a first height of the first rectangular calibration frame according to the first corner point coordinates specifically includes:
  extracting any two corner point coordinates in the first corner point coordinates having a same abscissa, and determining the first height according to a difference between ordinates of the extracted corner point coordinates; and The determining a second height of the second rectangular calibration frame according to the second corner point coordinates specifically includes:
  extracting any two corner point coordinates in the second corner point coordinates having a same abscissa, and determining the second height according to a difference between ordinates of the extracted corner point coordinates.

Alternatively, the size calibration parameter includes a calibration width and a calibration height, and the position calibration parameter includes origin calibration coordinates.

The determining the size calibration parameter and the position calibration parameter of the thermal image according to the zoom scale specifically includes:
  acquiring a first initial width, a first initial height and first coordinates of a first positioning point that are of the thermal image;
  determining second coordinates of a second positioning point in the visible light image corresponding to the first positioning point;
  determining the calibration width according to the zoom scale and the first initial width;
  determining the calibration height according to the zoom scale and the first initial height; and
  determining the origin calibration coordinates according to the zoom scale, the first coordinates and the second coordinates.

Alternatively, the first coordinates are any of the first upper-left corner point coordinates, the first lower-left corner point coordinates, the first upper-right corner point coordinates or the first lower-right corner point coordinates.

The second coordinates are any of the second upper-left corner point coordinates, the second lower-left corner point coordinates, the second upper-right corner point coordinates or the second lower-right corner point coordinates.

Alternatively, after the step of fusing the to-be-fused images, the method further includes:
  determining a coincident region of a thermal image region and a visible light region in the to-be-fused images; and
  cropping regions in the to-be-fused images other than the coincident region.

Alternatively, the determining coincident region of a thermal image region and a visible light region in the to-be-fused images specifically includes:
  determining third corner point coordinates of the thermal image region, where the third corner point coordinates include third upper-left corner point coordinates, third lower-left corner point coordinates, third upper-right corner point coordinates and third lower-right corner point coordinates;
  determining fourth corner point coordinates of the visible light region, where the fourth corner point coordinates include fourth upper-left corner point coordinates, fourth lower-left corner point coordinates, fourth upper-right corner point coordinates and fourth lower-right corner point coordinates;
  determining coordinates of a first corner point and a second corner point of the coincident region according to the third corner point coordinates and the fourth corner point coordinates, where the first corner point and the second corner point are diagonal corner points; and
  determining coordinates of a third corner point and a fourth corner point of the coincident region according to the coordinates of the first corner point and the second corner point.

Alternatively, an origin of the thermal image is any of an upper-left corner point, a lower-left corner point, an upper-right corner point or a lower-right corner point of the thermal image.

The determining third corner point coordinates of the thermal image region specifically includes:
  determining the third corner point coordinates of the thermal image region according to the calibration width, the calibration height and the origin calibration coordinates.

Alternatively, an origin of the visible light image is any of an upper-left corner point, a lower-left corner point, an upper-right corner point or a lower-right corner point of the visible light image.

The determining fourth corner point coordinates of the visible light region specifically includes:
  acquiring a second initial width, a second initial height and origin coordinates of the visible light image; and
  determining the fourth corner point coordinates of the visible light region according to the second initial width, the second initial height and the origin coordinates.

Alternatively, the first corner point and the second corner point are respectively a lower-left corner point and an upper-right corner point of the coincident region.

Formulas for determining the coordinates of the first corner point and the second corner point of the coincident region are as follows:

$$\begin{cases} x_1' \le x_1'' \le x_2', x_1 = x_1'' \\ x_1'' < x_1', x_1 = x_1' \end{cases}, \begin{cases} y_1' \le y_1'' \le y_2', y_1 = y_1'' \\ y_1'' < y_1', y_1 = y_1' \end{cases}$$

$$\begin{cases} x_2'' \le x_2', x_2 = x_2'' \\ x_2'' > x_2', x_2 = x_2' \end{cases}, \begin{cases} y_2'' \le y_2', y_2 = y_2'' \\ y_2'' > y_2', y_2 = y_2' \end{cases}$$

where $(x_1, y_1)$ and $(x_2, y_2)$ are respectively the coordinates of the first corner point and the second corner point; $(x_1'', y_2'')$ $(x_1'', y_1'')$, $(x_2'', y_2'')$ and $(x_2'', y_1'')$ are respectively the third upper-left corner point coordinates, the third lower-left corner point coordinates, the third upper-right corner point coordinates and the third lower-right corner point coordinates; and $(x_1', y_2')$, $(x_1', y_1')$, $(x_2', y_2')$ and $(x_2', y_1')$ are respectively the fourth upper-left corner point coordinates, the fourth lower-left corner point coordinates, the fourth upper-right corner point coordinates and the fourth lower-right corner point coordinates.

A principle of a formula for determining coordinates of the first corner point and the second corner point of the coincident region when the first corner point and the second corner point are respectively the upper-left corner point and the lower-right corner point of the coincident region and a principle of a formula for determining coordinates of the first corner point and the second corner point of the coincident region when the first corner point and the second corner point are respectively a lower-left corner point and an upper-right corner point of the coincident region are the same as the above. Therefore, details are not described herein again.

In this embodiment of the disclosure, the size calibration parameter and the position calibration parameter of the thermal image are determined by using the first focal length during capture of the thermal image and the second focal length during capture of the visible light image, then the size of the thermal image is adjusted according to the size calibration parameter, and the adjusted thermal image is moved to the visible light image according to the position calibration parameter for registration with the visible light image, to obtain the to-be-fused images, and the to-be-fused images are fused to generate the bifocal fused image. The size of the thermal image is adjusted according to the size calibration parameter so that an imaging ratio of the thermal image is the same as that of the visible light image. At this time, the adjusted thermal image is moved to the visible light image according to the position calibration parameter for registration with the visible light image. Therefore, the thermal image can coincide with the visible light image, so that the thermal image is accurately registered with the visible light image. In this way, picture quality of the fused image is improved.

Figure 5:
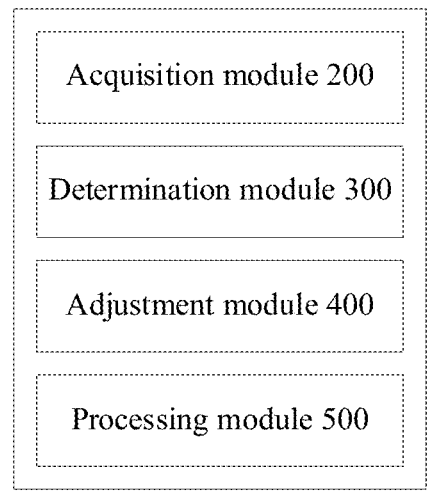
FIG. 5 is a schematic structural diagram of an image fusion apparatus according to an embodiment of the disclosure.

Further, FIG. 5 is a schematic structural diagram of an image fusion apparatus according to an embodiment of the disclosure. The functions of the modules of the image fusion apparatus are performed by the above bifocal camera 40, to accurately register a thermal image with a visible light image when focal lengths for capturing the thermal image and the visible light image are different, thereby improving picture quality of a fused image.

It should be noted that, the term "module" used in this embodiment of the disclosure may refer to a combination of software and/or hardware implementing a predetermined function. Although the apparatus described in the following embodiments may be implemented by using software, it is also conceivable that the apparatus may be implemented by using hardware, or a combination of software and hardware.

Specifically, the image fusion apparatus includes:
an acquisitor 200, configured to acquire a thermal image captured by the thermal imaging lens and a visible light image captured by the visible light lens;
a determinator 300, configured to: determine a first focal length when the thermal imaging lens captures the thermal image and a second focal length when the visible light lens captures the visible light image; and determine a size calibration parameter and a position calibration parameter of the thermal image according to the first focal length and the second focal length;
an adjustor 400, configured to adjust a size of the thermal image according to the size calibration parameter, and move the adjusted thermal image to the visible light image according to the position calibration parameter for registration with the visible light image, to obtain to-be-fused images; and
a processor 500, configured to fuse the to-be-fused images to generate a bifocal fused image.

In some embodiments, the determinator 300 is further configured to:
determine a zoom scale of the thermal image according to the first focal length and the second focal length; and
determine the size calibration parameter and the position calibration parameter of the thermal image according to the zoom scale.

In some embodiments, the thermal image includes a first rectangular calibration frame, and the visible light image includes a second rectangular calibration frame.

The determinator 300 is further configured to:
determine first corner point coordinates of the first rectangular calibration frame according to the first focal length, where the first corner point coordinates include first upper-left corner point coordinates, first lower-left corner point coordinates, first upper-right corner point coordinates and first lower-right corner point coordinates;
determine second corner point coordinates of the second rectangular calibration frame according to the second focal length, where the second corner point coordinates include second upper-left corner point coordinates, second lower-left corner point coordinates, second upper-right corner point coordinates and second lower-right corner point coordinates; and
determine the zoom scale of the thermal image according to the first corner point coordinates and the second corner point coordinates.

In some embodiments, the determinator 300 is further configured to:
determine a first width of the first rectangular calibration frame according to the first corner point coordinates;
determine a second width of the second rectangular calibration frame according to the second corner point coordinates; and
determine the zoom scale according to the first width and the second width;
or
determine a first height of the first rectangular calibration frame according to the first corner point coordinates;
determine a second height of the second rectangular calibration frame according to the second corner point coordinates; and
determine the zoom scale according to the first height and the second height.

In some embodiments, the determinator 300 is further configured to:
extract any two corner point coordinates in the first corner point coordinates having a same ordinate, and determine the first width according to a difference between abscissas of the extracted corner point coordinates.
extract any two corner point coordinates in the second corner point coordinates having a same ordinate, and determine the second width according to a difference between abscissas of the extracted corner point coordinates.
extract any two corner point coordinates in the first corner point coordinates having a same abscissa, and determine the first height according to a difference between ordinates of the extracted corner point coordinates; and
extract any two corner point coordinates in the second corner point coordinates having a same abscissa, and determine the second height according to a difference between ordinates of the extracted corner point coordinates.

In some embodiments, the size calibration parameter includes a calibration width and a calibration height, and the position calibration parameter includes origin calibration coordinates;

The determinator 300 is further configured to:
acquire a first initial width, a first initial height and first coordinates of a first positioning point that are of the thermal image;
determine second coordinates of a second positioning point in the visible light image corresponding to the first positioning point;
determine the calibration width according to the zoom scale and the first initial width;
determine the calibration height according to the zoom scale and the first initial height; and
determine the origin calibration coordinates according to the zoom scale, the first coordinates and the second coordinates.

In some embodiments, the first coordinates are any of the first upper-left corner point coordinates, the first lower-left corner point coordinates, the first upper-right corner point coordinates or the first lower-right corner point coordinates; and the second coordinates are any of the second upper-left corner point coordinates, the second lower-left corner point coordinates, the second upper-right corner point coordinates or the second lower-right corner point coordinates.

In some embodiments, the processor 500 is further configured to:
determine a coincident region of a thermal image region and a visible light region in the to-be-fused images; and
crop regions in the to-be-fused images other than the coincident region.

In some embodiments, the processor 500 is further configured to:
determine third corner point coordinates of the thermal image region, where the third corner point coordinates include third upper-left corner point coordinates, third lower-left corner point coordinates, third upper-right corner point coordinates and third lower-right corner point coordinates;
determine fourth corner point coordinates of the visible light region, where the fourth corner point coordinates include fourth upper-left corner point coordinates, fourth lower-left corner point coordinates, fourth upper-right corner point coordinates and fourth lower-right corner point coordinates;
determine coordinates of a first corner point and a second corner point of the coincident region according to the third corner point coordinates and the fourth corner point coordinates, where the first corner point and the second corner point are diagonal corner points; and
determine coordinates of a third corner point and a fourth corner point of the coincident region according to the coordinates of the first corner point and the second corner point.

In some embodiments, an origin of the thermal image is any of an upper-left corner point, a lower-left corner point, an upper-right corner point or a lower-right corner point of the thermal image.

The processor 500 is further configured to:
determine the third corner point coordinates of the thermal image region according to the calibration width, the calibration height and the origin calibration coordinates.

In some embodiments, an origin of the visible light image is any of an upper-left corner point, a lower-left corner point, an upper-right corner point or a lower-right corner point of the visible light image.

The processor 500 is further configured to:
acquire a second initial width, a second initial height and origin coordinates of the visible light image; and
determine the fourth corner point coordinates of the visible light region according to the second initial width, the second initial height and the origin coordinates.

In some embodiments, the first corner point and the second corner point are respectively a lower-left corner point and an upper-right corner point of the coincident region.

Formulas for determining the coordinates of the first corner point and the second corner point of the coincident region are as follows:

$$\begin{cases} x_1' \le x_1'' \le x_2', x_1 = x_1'' \\ x_1'' < x_1', x_1 = x_1' \end{cases}, \begin{cases} y_1' \le y_1'' \le y_2', y_1 = y_1'' \\ y_1'' < y_1', y_1 = y_1' \end{cases}$$

$$\begin{cases} x_2'' \le x_2', x_2 = x_2'' \\ x_2'' > x_2', x_2 = x_2' \end{cases}, \begin{cases} y_2'' \le y_2', y_2 = y_2'' \\ y_2'' > y_2', y_2 = y_2' \end{cases}$$

where $(x_1, y_1)$ and $(x_2, y_2)$ are respectively the coordinates of the first corner point and the second corner point; $(x_1'', y_2'')$ $(x_1'', y_1'')$, $(x_2'', y_2'')$ and $(x_2'', y_1'')$ are respectively the third upper-left corner point coordinates, the third lower-left corner point coordinates, the third upper-right corner point coordinates and the third lower-right corner point coordinates; and $(x_1', y_2')$, $(x_1', y_1')$, $(x_2', y_2')$ and $(x_2, y_1')$ are respectively the fourth upper-left corner point coordinates, the fourth lower-left corner point coordinates, the fourth upper-right corner point coordinates and the fourth lower-right corner point coordinates.

The apparatus embodiment and the method embodiment are based on the same concept. Therefore, for the content of the apparatus embodiment, reference may be made to the method embodiment without mutual conflict among content, and details are not described herein again.

In some other alternative embodiments, the acquisitor 200, the determinator 300, the adjustor 400 and the processor 500 may be processing chips of the bifocal camera 40.

In this embodiment of the disclosure, the size calibration parameter and the position calibration parameter of the thermal image are determined by using the first focal length during capture of the thermal image and the second focal length during capture of the visible light image, then the size of the thermal image is adjusted according to the size calibration parameter, and the adjusted thermal image is moved to the visible light image according to the position calibration parameter for registration with the visible light image, to obtain the to-be-fused images, and the to-be-fused images are fused to generate the bifocal fused image. The size of the thermal image is adjusted according to the size calibration parameter so that an imaging ratio of the thermal image is the same as that of the visible light image. At this time, the adjusted thermal image is moved to the visible light image according to the position calibration parameter for registration with the visible light image. Therefore, the thermal image can coincide with the visible light image, so that the thermal image is accurately registered with the visible light image. In this way, picture quality of the fused image is improved.

Figure 6:
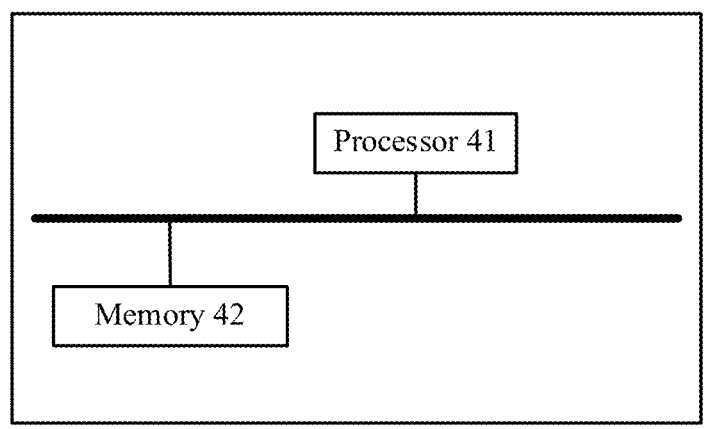
FIG. 6 is a schematic structural diagram of hardware of a bifocal camera according to an embodiment of the disclosure.

Further, FIG. 6 is a schematic structural diagram of hardware of a bifocal camera according to an embodiment of the disclosure. The bifocal camera includes one or more processors 41 and a memory 42. In FIG. 6, the bifocal camera includes one processor 41, for example.

The processor 41 and the memory 42 may be connected by a bus or in other manners. In FIG. 6, the processor and the memory are connected by a bus, for example.

As a non-volatile computer-readable storage medium, the memory 42 may be configured to store a non-volatile software program, a non-volatile computer-executable program and a module, for example, program instructions corresponding to the image fusion method and the modules (for example, the acquisitor 200, the determinator 300, the adjustor 400, the processor 500 and the like) corresponding to the image fusion apparatus in the above embodiments of the disclosure. The processor 41 executes various functional applications and data processing of the image fusion method by executing a non-volatile software program, an instruction and a module stored in the memory 42, that is, implements the image fusion method in the above method embodiment and the functions of the modules of the above apparatus embodiment.

The memory 42 may include a program storage area and a data storage area. The program storage area may store an operating system and an application program required for at least one function. The data storage area may store data created according to the use of the image fusion apparatus and the like.

The storage data area further stores preset data, including a correspondence table of a preset first focal length and preset first corner point coordinates, a correspondence table of a preset second focal length and preset second corner point coordinates, a correspondence table of a preset zoom scale, a preset size calibration parameter and a preset position calibration parameter and a correspondence table of a preset first focal length, a preset second focal length, a preset size calibration parameter and a preset position calibration parameter.

In addition, the memory 42 may include a high-speed random access memory, and may also include a nonvolatile memory, for example, at least one magnetic disk storage device, a flash memory, or another non-volatile solid-state storage device. In some embodiments, the memory 42 alternatively includes memories disposed remote to the processor 41, and these remote memories may be connected to the processor 41 through a network. The foregoing examples of the network include, but are not limited to, the Internet, an intranet, a local area network, a mobile communication network, and a combination thereof.

The program instructions and one or more modules are stored in the memory 42, and the program instructions and the one or more modules, when executed by the one or more processors 41, perform steps of the image fusion method in any of the foregoing method embodiments, or implement functions of the modules of the image fusion apparatus in any of the foregoing apparatus embodiments.

For the foregoing product, the method provided in the embodiments of the disclosure may be performed, and the corresponding functional modules for performing the method and beneficial effects thereof are provided. For technical details not described in detail in this embodiment, reference may be made to the method provided in the foregoing embodiments of the disclosure.

An embodiment of the disclosure further provides a non-transitory computer-readable storage medium, storing computer-executable instructions. The computer-executable instructions, when executed by one or more processors such as one processor 41 in FIG. 6, may cause a computer to perform steps of the image fusion method in any of the foregoing method embodiments, or implement functions of the modules of the image fusion apparatus in any of the foregoing apparatus embodiments.

An embodiment of the disclosure further provides a computer program product, including a computer program stored on a non-volatile computer-readable storage medium. The computer program includes program instructions, and the program instructions, when executed by one or more processors such as one processor 41 in FIG. 6, may cause a computer to perform steps of the image fusion method in any of the foregoing method embodiments, or implement functions of the modules of the image fusion apparatus in any of the foregoing apparatus embodiments.

The described apparatus embodiment is merely an example. The modules described as separate parts may or may not be physically separated, and parts displayed as modules may or may not be physical units, may be located in one position, or may be distributed on a plurality of network units. A part or all of the modules may be selected according to actual requirements to achieve the objectives of the solutions of the embodiments of the disclosure.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

The foregoing descriptions are embodiments of the disclosure, and the protection scope of the disclosure is not limited thereto. All equivalent structure or process changes made according to the content of this specification and accompanying drawings in the disclosure or by directly or indirectly applying the disclosure in other related technical fields shall fall within the protection scope of the disclosure.

Finally, it should be noted that: the foregoing embodiments are merely used for describing the technical solutions of the disclosure, but are not intended to limit the disclosure. Under the ideas of the disclosure, the technical features in the foregoing embodiments or different embodiments may also be combined, the steps may be performed in any order, and many other changes of different aspects of the disclosure also exists as described above, and these changes are not provided in detail for simplicity. Although the disclosure is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the disclosure.

What is claimed is:

1. An image fusion method, applicable to a bifocal camera, the bifocal camera comprising a thermal imaging lens and a visible light lens, wherein the method comprises:
　acquiring a thermal image captured by the thermal imaging lens and a visible light image captured by the visible light lens;
　determining a first focal length when the thermal imaging lens captures the thermal image and a second focal length when the visible light lens captures the visible light image;
　adjusting a size of the thermal image to be consistent with an image ratio of the visible light image;
　obtaining an origin calibration coordinate, the origin calibration coordinate configured to adjust an origin of an adjusted thermal image;
　overlapping the origin of the adjusted thermal image with origin calibration coordinates in the visible light image, to obtain to-be-fused images; and
　fusing the to-be-fused images to generate a bifocal fused image.

2. The method according to claim 1, wherein adjusting the size of the thermal image to be consistent with the image ratio of the visible image further comprises:
　determining a size calibration parameter of the thermal image according to the first focal length and the second focal length;
　determining a zoom scale of the thermal image according to the first focal length and the second focal length; and
　determining the size calibration parameter of the thermal image according to the zoom scale.

3. The method according to claim 2, wherein the thermal image comprises a first rectangular calibration frame, and the visible light image comprises a second rectangular calibration frame; and
　determining the zoom scale of the thermal image according to the first focal length and the second focal length further comprises:
　　determining first corner point coordinates of the first rectangular calibration frame according to the first focal length, wherein the first corner point coordinates comprise first upper-left corner point coordinates, first lower-left corner point coordinates, first upper-right corner point coordinates, and first lower-right corner point coordinates;
　　determining second corner point coordinates of the second rectangular calibration frame according to the second focal length, wherein the second corner point coordinates comprise second upper-left corner point coordinates, second lower-left corner point coordinates, second upper-right corner point coordinates, and second lower-right corner point coordinates; and
　　determining the zoom scale of the thermal image according to the first corner point coordinates and the second corner point coordinates.

4. The method according to claim 3, wherein determining the zoom scale of the thermal image according to the first corner point coordinates and the second corner point coordinates further comprises:
　determining a first width of the first rectangular calibration frame according to the first corner point coordinates;
　determining a second width of the second rectangular calibration frame according to the second corner point coordinates; and
　determining the zoom scale according to the first width and the second width.

5. The method according to claim 4, wherein
　determining the first width of the first rectangular calibration frame according to the first corner point coordinates further comprises:
　　extracting any two corner point coordinates in the first corner point coordinates having a same ordinate, and determining the first width according to a difference between abscissas of the two corner point coordinates;
　determining the second width of the second rectangular calibration frame according to the second corner point coordinates further comprises:
　　extracting any two corner point coordinates in the second corner point coordinates having a same ordinate, and determining the second width according to a difference between abscissas of the two corner point coordinates; and
　the method further comprises:
　determining a first height of the first rectangular calibration frame according to the first corner point coordinates, comprising:
　　extracting any two corner point coordinates in the first corner point coordinates having a same abscissa, and determining the first height according to a difference between ordinates of the two corner point coordinates; and
　determining a second height of the second rectangular calibration frame according to the second corner point coordinates, comprising:
　　extracting any two corner point coordinates in the second corner point coordinates having a same abscissa, and determining the second height according to a difference between ordinates of the two corner point coordinates.

6. The method according to claim 3, wherein the size calibration parameter comprises a calibration width and a calibration height, and obtaining the origin calibration coordinate further comprises:
　acquiring a first initial width, a first initial height and first coordinates of a first positioning point of the thermal image;
　determining second coordinates of a second positioning point in the visible light image corresponding to the first positioning point;
　determining the calibration width according to the zoom scale and the first initial width;
　determining the calibration height according to the zoom scale and the first initial height; and
　determining the origin calibration coordinates according to the zoom scale, the first coordinates and the second coordinates.

7. The method according to claim 6, wherein
　the first coordinates are any of the first upper-left corner point coordinates, the first lower-left corner point coordinates, the first upper-right corner point coordinates or the first lower-right corner point coordinates; and
　the second coordinates are any of the second upper-left corner point coordinates, the second lower-left corner point coordinates, the second upper-right corner point coordinates or the second lower-right corner point coordinates.

8. The method according to claim 6, wherein after fusing the to-be-fused images, the method further comprises:
　determining a coincident region of a thermal image region and a visible light region in the to-be-fused images; and cropping regions in the to-be-fused images other than the coincident region.

9. The method according to claim 8, wherein determining the coincident region of the thermal image region and the visible light region in the to-be-fused images further comprises:
    determining third corner point coordinates of the thermal image region, wherein the third corner point coordinates comprise third upper-left corner point coordinates, third lower-left corner point coordinates, third upper-right corner point coordinates and third lower-right corner point coordinates;
    determining fourth corner point coordinates of the visible light region, wherein the fourth corner point coordinates comprise fourth upper-left corner point coordinates, fourth lower-left corner point coordinates, fourth upper-right corner point coordinates and fourth lower-right corner point coordinates;
    determining coordinates of a first corner point and a second corner point of the coincident region according to the third corner point coordinates and the fourth corner point coordinates, wherein the first corner point and the second corner point are diagonal corner points; and
    determining coordinates of a third corner point and a fourth corner point of the coincident region according to the coordinates of the first corner point and the second corner point.

10. The method according to claim 9, wherein an origin of the adjusted thermal image is any of an upper-left corner point, a lower-left corner point, an upper-right corner point or a lower-right corner point of the thermal image; and
    determining third corner point coordinates further comprises:
        determining third corner point coordinates of the adjusted thermal image region according to the calibration width, the calibration height and the origin calibration coordinates.

11. The method according to claim 9, wherein an origin of the visible light image is any of an upper-left corner point, a lower-left corner point, an upper-right corner point or a lower-right corner point of the visible light image; and
    determining the fourth corner point coordinates of the visible light region further comprises:
        acquiring a second initial width, a second initial height and origin coordinates of the visible light image; and
        determining the fourth corner point coordinates of the visible light region according to the second initial width, the second initial height and the origin coordinates.

12. The method according to claim 9, wherein the first corner point and the second corner point are respectively a lower-left corner point and an upper-right corner point of the coincident region; and
    formulas for determining the coordinates of the first corner point and the second corner point of the coincident region are as follows:

$$\begin{cases} x'_1 \le x''_1 \le x'_2, x_1 = x''_1 \\ x''_1 < x'_1, x_1 = x'_1 \end{cases}, \begin{cases} y'_1 \le y''_1 \le y'_2, y_1 = y''_1 \\ y''_1 < y'_1, y_1 = y'_1 \end{cases}$$

$$\begin{cases} x''_2 \le x'_2, x_2 = x''_2 \\ x''_2 > x'_2, x_2 = x'_2 \end{cases}, \begin{cases} y''_2 \le y'_2, y_2 = y''_2 \\ y''_2 > y'_2, y_2 = y'_2 \end{cases}$$

wherein $(x_1, y_1)$ and $(x_2, y_2)$ are respectively the coordinates of the first corner point and the second corner point; $(x_1'', y_2'')$ $(x_1'', y_1'')$, $(x_2'', y_2'')$ and $(x_2'', y_1'')$ are respectively the third upper-left corner point coordinates, the third lower-left corner point coordinates, the third upper-right corner point coordinates, and the third lower-right corner point coordinates; and $(x_1', y_2')$, $(x_1', y_1')$, $(x_2', y_2')$ and $(x_2, y_1')$ are respectively the fourth upper-left corner point coordinates, the fourth lower-left corner point coordinates, the fourth upper-right corner point coordinates, and the fourth lower-right corner point coordinates.

13. An image fusion apparatus, applicable to a bifocal camera, the bifocal camera comprising a thermal imaging lens and a visible light lens, wherein the apparatus comprises:
    an acquisitor, configured to acquire a thermal image captured by the thermal imaging lens and a visible light image captured by the visible light lens;
    a determinator, configured to determine a first focal length when the thermal imaging lens captures the thermal image and a second focal length when the visible light lens captures the visible light image; and
    an adjustor, configured to: adjust a size of the thermal image to be consistent with an image ratio of the visible light image;
    obtain an origin calibration coordinate, the origin calibration coordinate configured to adjust an origin of an adjusted thermal image,
    overlap the origin of the adjusted thermal image with origin calibration coordinates in the visible light image, to obtain to-be-fused images;
    a processor, configured to fuse the to-be-fused images to generate a bifocal fused image.

14. A bifocal camera, comprising:
    a thermal imaging lens, configured to capture a thermal image;
    a visible light lens, configured to capture a visible light image;
    at least one processor; and
    a memory, communicatively connected to the at least one processor, wherein
    the memory stores instructions executable by the at least one processor, the instructions, when executed by the at least one processor, causing the at least one processor to perform acts comprising:
    acquiring a thermal image captured by the thermal imaging lens and a visible light image captured by the visible light lens;
    determining a first focal length when the thermal imaging lens captures the thermal image and a second focal length when the visible light lens captures the visible light image;
    adjusting a size of the thermal image to be consistent with an image ratio of the visible light image;
    obtaining an origin calibration coordinate, the origin calibration coordinate configured to adjust an origin of an adjusted thermal image,
    overlapping the origin of the adjusted thermal image with origin calibration coordinates in the visible light image, to obtain to-be-fused images; and
    fusing the to-be-fused images to generate a bifocal fused image.

15. The camera according to claim 14, wherein the at least one processor is further configured to:
    determine a zoom scale of the thermal image according to the first focal length and the second focal length; and
    determine the size calibration parameter of the thermal image according to the zoom scale.

16. The camera according to claim 15, wherein the thermal image comprises a first rectangular calibration frame, and the visible light image comprises a second rectangular calibration frame; and the at least one processor is further configured to:

determine first corner point coordinates of the first rectangular calibration frame according to the first focal length, wherein the first corner point coordinates comprise first upper-left corner point coordinates, first lower-left corner point coordinates, first upper-right corner point coordinates and first lower-right corner point coordinates;

determine second corner point coordinates of the second rectangular calibration frame according to the second focal length, wherein the second corner point coordinates comprise second upper-left corner point coordinates, second lower-left corner point coordinates, second upper-right corner point coordinates and second lower-right corner point coordinates; and determine the zoom scale of the thermal image according to the first corner point coordinates and the second corner point coordinates.

17. The camera according to claim 16, wherein the at least one processor is further configured to:

determine a first height of the first rectangular calibration frame according to the first corner point coordinates;

determine a second height of the second rectangular calibration frame according to the second corner point coordinates; and determine the zoom scale according to the first height and the second height.

18. The camera according to claim 17, wherein the at least one processor is further configured to:

extract any two corner point coordinates in the first corner point coordinates having a same ordinate, and determine the first width according to a difference between abscissas of the two corner point coordinates;

extract any two corner point coordinates in the second corner point coordinates having a same ordinate, and determine the second width according to a difference between abscissas of the two corner point coordinates;

extract any two corner point coordinates in the first corner point coordinates having a same abscissa, and determine the first height according to a difference between ordinates of the two corner point coordinates; and extract any two corner point coordinates in the second corner point coordinates having a same abscissa, and determine the second height according to a difference between ordinates of the two corner point coordinates.

19. The camera according to claim 16, wherein the size calibration parameter comprises a calibration width and a calibration height, and a position calibration parameter comprises origin calibration coordinates; and the at least one processor is further configured to:

acquire a first initial width, a first initial height and first coordinates of a first positioning point of the thermal image;

determine second coordinates of a second positioning point in the visible light image corresponding to the first positioning point;

determine the calibration width according to the zoom scale and the first initial width;

determine the calibration height according to the zoom scale and the first initial height; and determine the origin calibration coordinates according to the zoom scale, the first coordinates and the second coordinates.

20. The camera according to claim 19, wherein the first coordinates are any of the first upper-left corner point coordinates, the first lower-left corner point coordinates, the first upper-right corner point coordinates or the first lower-right corner point coordinates; and the second coordinates are any of the second upper-left corner point coordinates, the second lower-left corner point coordinates, the second upper-right corner point coordinates or the second lower-right corner point coordinates.

\* \* \* \* \*